(12) United States Patent
Motokawa et al.

(10) Patent No.: US 11,081,764 B2
(45) Date of Patent: Aug. 3, 2021

(54) BATTERY MODULE

(71) Applicant: Panasonic Intellectual Property Management Co., Ltd., Osaka (JP)

(72) Inventors: Shinya Motokawa, Osaka (JP); Yoshito Kaga, Osaka (JP); Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 213 days.

(21) Appl. No.: 16/331,640

(22) PCT Filed: Nov. 8, 2017

(86) PCT No.: PCT/JP2017/040171
§ 371 (c)(1),
(2) Date: Mar. 8, 2019

(87) PCT Pub. No.: WO2018/096926
PCT Pub. Date: May 31, 2018

(65) Prior Publication Data
US 2019/0363334 A1 Nov. 28, 2019

(30) Foreign Application Priority Data
Nov. 22, 2016 (JP) .............................. JP2016-226592

(51) Int. Cl.
*H01M 50/581* (2021.01)
*H01M 50/531* (2021.01)

(52) U.S. Cl.
CPC ....... *H01M 50/581* (2021.01); *H01M 50/531* (2021.01); *H01M 2200/10* (2013.01)

(58) Field of Classification Search
CPC ............. H01M 50/581; H01M 50/531; H01M 50/502; H01M 50/20
See application file for complete search history.

(56) References Cited

U.S. PATENT DOCUMENTS

| | | | |
|---|---|---|---|
| 2012/0263995 A1 | 10/2012 | Naito et al. | |
| 2014/0147705 A1 | 5/2014 | Wang et al. | |
| 2016/0086753 A1* | 3/2016 | Mochizuki | ............. H01H 37/52 337/380 |

FOREIGN PATENT DOCUMENTS

| | | |
|---|---|---|
| JP | 11-016466 | 1/1999 |
| JP | 2007-273179 | 10/2007 |
| JP | 2014-107264 | 6/2014 |
| WO | 2012/073403 | 6/2012 |

OTHER PUBLICATIONS

International Search Report of PCT application No. PCT/JP2017/040171 dated Dec. 19, 2017.

* cited by examiner

*Primary Examiner* — Stewart A Fraser
(74) *Attorney, Agent, or Firm* — McDermott Will & Emery LLP

(57) ABSTRACT

A battery module has a plurality of battery cells each including a cell case and a battery element contained in the cell case. The battery module includes a lead to electrically connect a terminal of each of the battery cells to a current collector and a heat shutoff mechanism to break electrical connection between the terminal and the current collector by heat from the cell case when the cell case reaches a predetermined temperature or higher.

8 Claims, 8 Drawing Sheets

BATTERY MODULE

CROSS-REFERENCE TO RELATED APPLICATIONS

This application is a U.S. national stage application of the PCT International Application No. PCT/JP2017/040171 filed on Nov. 8, 2017, which claims the benefit of foreign priority of Japanese patent application 2016-226592 filed on Nov. 22, 2016, the contents all of which are incorporated herein by reference.

TECHNICAL FIELD

The present disclosure relates to a battery module.

BACKGROUND ART

A conventional battery module is disclosed in PTL 1. This battery module includes a plurality of battery cells arranged in a matrix. Positive electrode terminals of the battery cells are electrically connected to a positive-electrode current collector plate made of a conductive flat board, whereas negative electrode terminals of the battery cells are electrically connected via fuses to a negative-electrode current collector plate made of a conductive flat board. Thus, the battery module has the plurality of the parallel-connected battery cells and is designed to separate any battery cell through which a heavy current greater than or equal to a rated current has flowed from an electric circuit by blowing the fuse of the battery cell with Joule heat. This configuration prevents the battery cell from abnormally generating heat due to the flow of heavy current through the battery cell.

CITATION LIST

Patent Literature

PTL 1: International Patent Publication No. 2012/073403

SUMMARY OF THE INVENTION

Technical Problem

Electric current flowing through the fuse varies with factors such as a type of the battery cell (a difference in internal resistance), a number of the parallel-connected battery cells, and a structure of the module (an exhaust system). Thus, the design of fuses involves taking at least these three factors into consideration and the fuses need to be redesigned every time a change is made in the three factors. As a result, the electric circuit is not simple in configuration, unfortunately.

Hence, it is an object of the present disclosure to provide a battery module that facilitates the formation of an electric circuit designed to separate a battery cell that has abnormally generated heat as compared to a conventional battery module including a fuse.

Solution to Problem

A battery module according to an aspect of the present disclosure has a plurality of battery cells each including a cell case and a battery element contained in the cell case. The battery module includes a lead to electrically connect a terminal of each of the battery cells to a current collector plate and a heat shutoff mechanism to break electrical connection between the terminal and the current collector plate by heat from the cell case when the cell case reaches a predetermined temperature or higher.

Advantageous Effect of Invention

In the battery module according to the present disclosure, the heat shutoff mechanism separates a battery cell that has abnormally generated heat from an electric circuit depending on temperature of the cell case of the battery cell, which is less influenced by the type of the battery cell (a difference in internal resistance), a number of the parallel-connected battery cells, and a difference in a structure of the module (an exhaust system) than electric current flowing through the terminal of the battery cell is. As a result, an identical heat shutoff mechanism can be applied to battery modules in an expanded range as compared to an identical fuse that can be applied to battery modules in a certain range. Thus, a battery module according to the present disclosure facilitates the formation of a target electric circuit as compared to a conventional battery module including a fuse.

BRIEF DESCRIPTION OF DRAWINGS

FIG. 4A is a schematic cross-sectional view taken when the cylindrical battery is in a normal state, and FIG. 4B is a schematic cross-sectional view taken when the cylindrical battery is in a state in which heat is abnormally generated.

DESCRIPTION OF EMBODIMENTS

Exemplary embodiments of the present disclosure will now be described in detail with reference to the attached drawings. It is initially envisaged that a new exemplary embodiment can be made by suitably combining some distinctive elements in any of the exemplary embodiments and modifications described hereafter. In the following description and the drawings, a Z direction represents a height direction of cylindrical battery 11.

First Exemplary Embodiment

Figure 1:
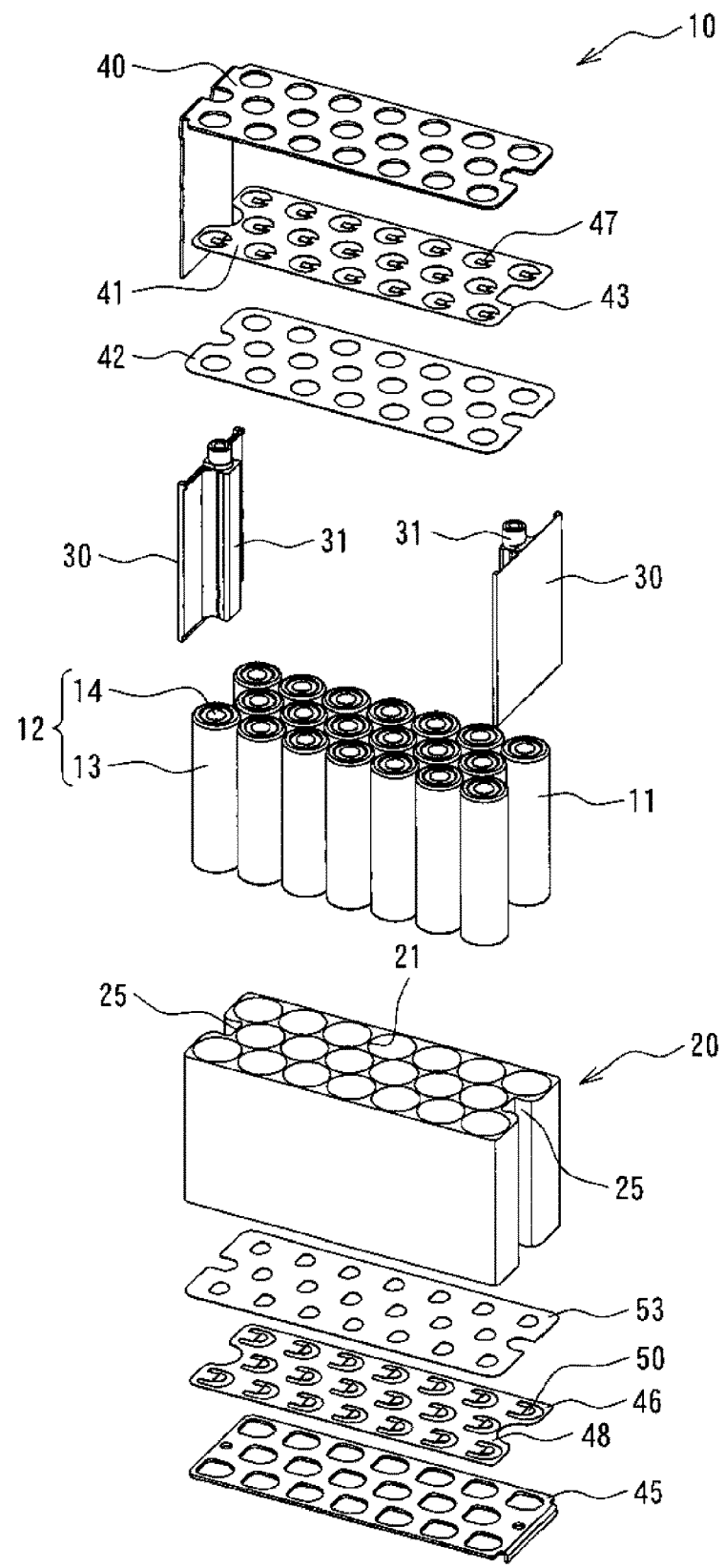
FIG. 1 is an exploded perspective view of a battery module according to a first exemplary embodiment of the present disclosure.

FIG. 1 is an exploded perspective view of battery module 10 according to a first exemplary embodiment of the present disclosure. First, with reference to FIG. 1, an overview of battery module 10 will be described. As shown in FIG. 1, battery module 10 includes a plurality of cylindrical batteries 11 and battery holder 20 having a plurality of cylindrical containers to hold cylindrical batteries 11.

Cylindrical battery 11, an example of a battery cell, includes cell case 12 made of metal, a battery element (not shown) contained in cell case 12, a positive electrode terminal, and a negative electrode terminal. The battery element includes a pair of electrodes and a non-aqueous electrolyte to permit the transfer of electric charge. Cell case 12 is made up of cell case body 13 that is formed in a bottomed cylindrical shape to contain the battery element and sealing body 14 sealing an opening of cell case body 13. A gasket (not shown) is disposed between cell case body 13 and sealing body 14. For example, sealing body 14 has a layered structure including a valve and a cap and is electrically connected to a positive electrode of the battery element to function as the positive electrode terminal of cylindrical battery 11. Cell case body 13 functions as a negative electrode of cylindrical battery 11. In general, however, an outer peripheral side surface of cell case body 13 is covered with an insulating resin film and a bottom surface of cell case body 13 functions as the negative electrode terminal. Cylindrical battery 11 is contained in hole 21 of each of the cylindrical containers in battery holder 20.

Battery module 10 includes a pair of posts 30 attached to battery holder 20. Posts 30 are plate-shaped components that cover both lateral faces of battery holder 20. Each post 30 has protrusion 31 on one surface. Posts 30 are disposed so as to face each other through battery holder 20, with protrusions 31 facing battery holder 20. Protrusions 31 are fitted into recesses 25 in battery holder 20.

Positive-electrode lead plate 41 electrically connected to the positive electrode terminals of the plurality of cylindrical batteries 11 is disposed above battery holder 20, with positive-electrode insulation board 42 interposed between the lead plate and the battery holder. Positive-electrode current collector plate 40 electrically connected to positive-electrode lead plate 41 is disposed above the positive-electrode lead plate.

Meanwhile, negative-electrode lead plate 46 electrically connected to the negative electrode terminals of the plurality of cylindrical batteries 11 is disposed below battery holder 20, with negative-electrode insulation board 53 interposed between the lead plate and the battery holder. Negative-electrode current collector plate 45 electrically connected to negative-electrode lead plate 46 is disposed below the negative-electrode lead plate. The plurality of cylindrical batteries 11 is connected in parallel with positive- and negative-electrode lead plates 41, 46. Positive-electrode lead plate 41 includes positive-electrode plate body 43 and positive-electrode leads 47. Positive-electrode plate body 43 is electrically connected with the positive electrode of each cylindrical battery 11 via positive-electrode lead 47. Negative-electrode lead plate 46 includes negative-electrode plate body 48 and negative-electrode leads 50. Negative-electrode plate body 48 is electrically connected with the negative electrode of each cylindrical battery 11 via negative-electrode lead 50.

Positive- and negative-electrode insulation boards 42, 53 are disposed between battery holder 20 and respective positive- and negative-electrode lead plates 41, 46. The insulation boards have holes to partly expose the terminals of the plurality of cylindrical batteries 11. Positive-electrode current collector plate 40, negative-electrode current collector plate 45, and other components are fixed to the pair of posts 30 using screws (not shown), for example. Battery module 10 is, for example, connected in series with other adjacently disposed battery module 10 by positive-electrode current collector plate 40 and negative-electrode current collector plate 45.

Figure 2A:
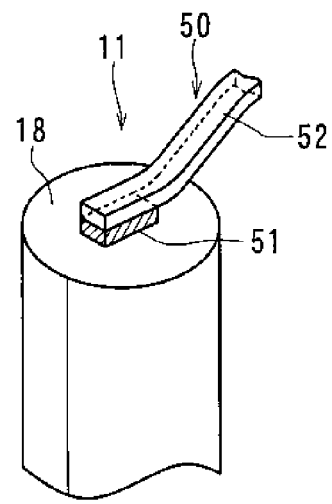
FIG. 2A is a schematic perspective view of a structure of a negative-electrode lead for a cylindrical battery, illustrating an action performed by the negative-electrode lead in response to abnormal heat generation in the cylindrical battery.

FIG. 2A is a schematic perspective view of a structure of negative-electrode lead 50 for cylindrical battery 11, illustrating an action performed by negative-electrode lead 50 in response to abnormal heat generation in cylindrical battery 11. As shown in FIG. 2A, negative-electrode lead 50 includes melting member 51 that is an example of a heat shutoff mechanism and high-melting-point member 52 with a melting point higher than that of the melting member. Melting member 51 is made from tin (with a melting point of 232 degrees Celsius), a tin alloy (with a melting point of around 300 degrees Celsius), or a solder alloy (with a melting point of around 180 degrees Celsius), for example. Preferably, melting member 51 is made of a metallic material with a melting point of 500 degrees Celsius or lower, and is more preferably made of a metallic material with a melting point of 400 degrees Celsius or lower. High-melting-point member 52 is made from aluminum (with a melting point of 660 degrees Celsius) or copper (with a melting point of 1,085 degrees Celsius), for example, and is preferably made of a metallic material with a melting point of 550 degrees Celsius or higher.

High-melting-point member 52 constitutes a part of negative-electrode lead 50 adjacent to negative-electrode plate body 48 and connects with negative-electrode plate body 48. Melting member 51 constitutes a part of negative-electrode lead 50 extending in a direction. Melting member 51 is disposed at a boundary between high-melting-point member 52 and negative-electrode bottom surface 18. Specifically, melting member 51 is disposed between an end of high-melting-point member 52 adjacent to cylindrical battery 11 and negative-electrode bottom surface 18 of cylindrical battery 11. Melting member 51 is joined to both the end of high-melting-point member 52 adjacent to cylindrical battery 11 and negative-electrode bottom surface 18 by ultrasonic metal welding or laser spot welding. High-melting-point member 52 is electrically connected with negative-electrode bottom surface 18 via melting member 51.

The action performed by negative-electrode lead 50 in response to abnormal heat generation in cylindrical battery 11 will now be described. If cylindrical battery 11 abnormally generates heat due to a minute short circuit between the positive electrode and the negative electrode inside cell case 12 or other reason, temperature of the cell case of cylindrical battery 11, for example, rises to about 500 degrees Celsius, an example predetermined temperature. Then, melting member 51 melts with heat from cell case 12 (negative-electrode bottom surface 18) and separates from high-melting-point member 52. As a result, electrical connection gets broken between negative-electrode bottom surface 18 and high-melting-point member 52. This separates cylindrical battery 11 that has abnormally generated heat from an electric circuit (the batteries connected in parallel).

Joining of high-melting-point member 52 to negative-electrode bottom surface 18 via melting member 51 may cause the high-melting-point member to be pressed toward negative-electrode bottom surface 18 because of elasticity high-melting-point member 52 has. In this case, when melting member 51 melts with heat from cell case 12, force for pressing high-melting-point member 52 toward negative-electrode bottom surface 18 disappears, so that high-melting-point member 52 can freely move. Then, high-melting-point member 52 moves toward negative-electrode plate body 48 to correct distortion owing to its internal elasticity, so that the high-melting-point member is separated from melt melting member 51. This configuration reliably breaks electrical connection between negative-electrode bottom surface 18 and high-melting-point member 52 and reliably separates cylindrical battery 11 that has abnormally generated heat from the electric circuit.

In the exemplary embodiment described above, the heat shutoff mechanism separates cylindrical battery 11 that has abnormally generated heat from the electric circuit depending on temperature of cell case 12 of cylindrical battery 11, which is less influenced by the type of cylindrical battery 11 (a difference in internal resistance), the number of parallel-connected cylindrical batteries 11, and a difference in the module structure (the exhaust system) than electric current flowing through the negative-electrode terminal of cylindrical battery 11 is. As a result, an identical heat shutoff mechanism can be applied to battery modules 10 with specifications in an expanded range as compared to an identical fuse that can be applied to battery modules 10 with specifications in a certain range. Thus, a battery module according to the exemplary embodiment facilitates the formation of a target electric circuit as compared to a conventional battery module including a fuse.

Figure 2B:
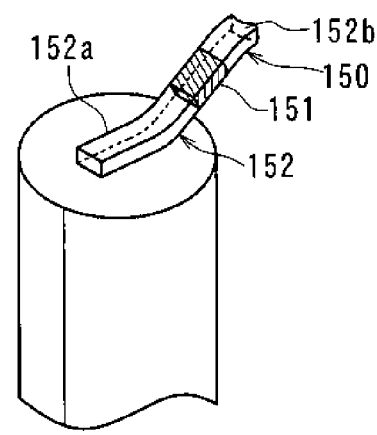
FIG. 2B is a schematic perspective view of a modification of the negative-electrode lead in FIG. 2A according to the first exemplary embodiment.
Figure 3:
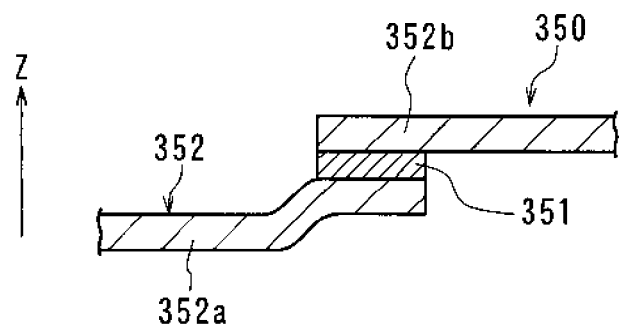
FIG. 3 is a cross-sectional view of the modification of the negative-electrode lead in the battery module, viewed when the modified lead is vertically sectioned into two equal parts by a plane including a direction in which the modified lead extends and a height direction of the cylindrical battery.

In the first exemplary embodiment described above, melting member 51 is disposed at a boundary between high-melting-point member 52 and negative-electrode bottom surface 18. However, as shown in FIG. 2B, melting member 151 may constitute a part of negative-electrode lead 150 other than both ends of the negative-electrode lead extending in a direction. When melting member 151 melts, the battery module may separate cylindrical battery 11 that has abnormally generated heat from the electric circuit by dividing high-melting-point member 152 into portion 152a adjacent to the battery and portion 152b adjacent to the negative-electrode plate body and thereby breaking electrical connection between negative-electrode bottom surface 18 and negative-electrode plate body 48 (refer to FIG. 1). In this case, as shown in FIG. 3, i.e. a cross-sectional view of negative-electrode lead 350 that is viewed when the lead is vertically sectioned into two equal parts by a plane including a direction in which the lead extends and the Z direction, melting member 351 may be formed of a metallic plate piece having a substantially flat shape. Then, one side surface of the melting member may be joined to portion 352a of high-melting-point member 352 adjacent to the battery, whereas the other side surface of the melting member may be joined to portion 352b of high-melting-point member 352 adjacent to the negative-electrode plate body. This structure is preferable because negative-electrode lead 350 can be readily assembled.

Figure 2C:
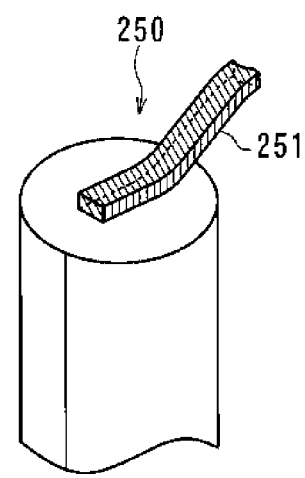
FIG. 2C is a schematic perspective view of another modification of the negative-electrode lead in FIG. 2A according to the first exemplary embodiment.

Alternatively, as shown in FIG. 2C, negative-electrode lead 250 may be entirely formed of melting member 251. This configuration enables the battery module to reliably separate cylindrical battery 11 that has abnormally generated heat from the electric circuit and is thus preferable.

At least a part of negative-electrode lead 50 extending in a direction is formed of melting member 51. However, at least a part of the positive-electrode lead extending in a direction may be formed of a melting member, or the negative- and the positive-electrode leads extending in directions may be at least partly formed of melting members, respectively. In the battery module described above, all the plurality of cylindrical batteries 11 is connected in parallel. However, the plurality of the cylindrical batteries may include two or more cylindrical batteries that are connected in series. The battery cells described above are cylindrical batteries 11. However, the battery cells may be rectangular batteries.

In the exemplary embodiment described above, the temperature of the cell case of cylindrical battery 11 that has abnormally generated heat reaches about 500 degrees Celsius. Naturally, the temperature of a cell case of a cylindrical battery that has abnormally generated heat varies from specification to specification. Thus, the melting member may be made from any material depending on the specification of the cylindrical battery with proviso that the material melts with heat from the cell case of the cylindrical battery that has abnormally generated heat. The cell case of the cylindrical battery that has abnormally generated heat may reach any temperature within a range of 100 degrees Celsius to 650 degrees Celsius.

Second Exemplary Embodiment

Figure 4A:
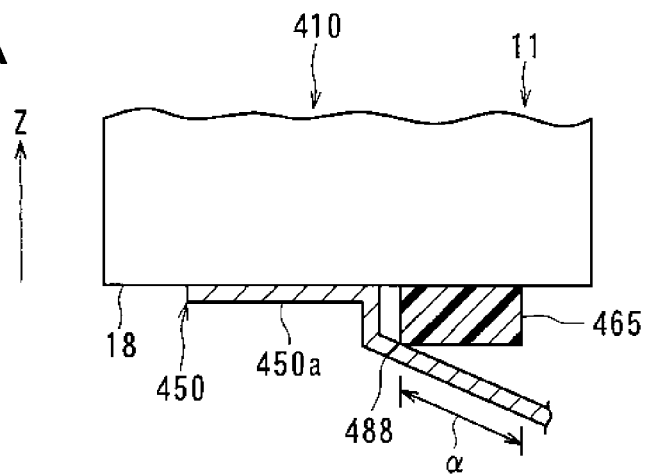
FIG. 4A and FIG. 4B are schematic cross-sectional views each illustrating a structure around a negative-electrode end of a cylindrical battery in a battery module according to a second exemplary embodiment, viewed when a negative-electrode lead is vertically sectioned into two equal parts by a plane including a direction in which the negative-electrode lead extends and the height direction described above.
Figure 4B:
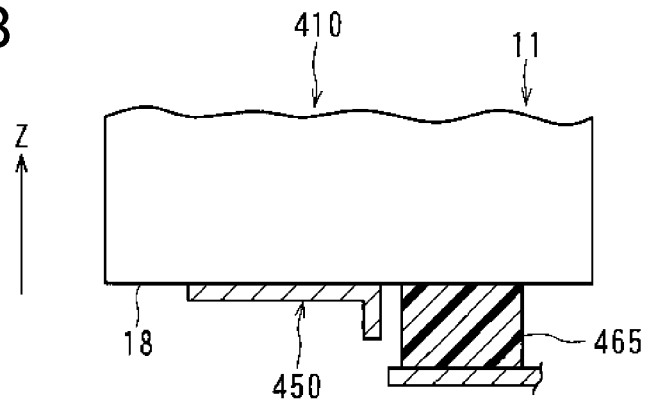
Figure 5:
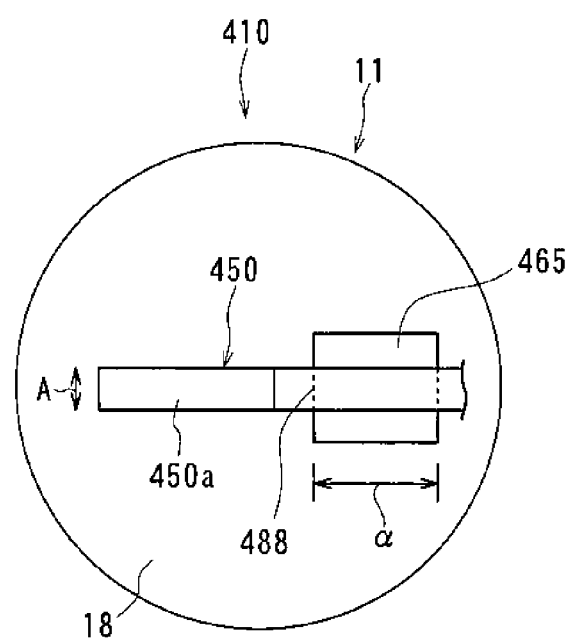
FIG. 5 is a schematic plan view of the structure of FIG. 4A when viewed from outside a negative-electrode bottom surface of the cylindrical battery along the height direction.

FIGS. 4A and 4B are schematic cross-sectional views each illustrating a structure around an end of cylindrical battery 11 adjacent to a negative electrode terminal in the Z direction in battery module 410 according to a second exemplary embodiment, viewed when negative-electrode lead 450 is vertically sectioned into two equal parts by a plane including a direction in which the negative-electrode lead extends and the Z direction. FIG. 4A is a schematic cross-sectional view taken when cylindrical battery 11 is in a normal state, and FIG. 4B is a schematic cross-sectional view taken when cylindrical battery 11 has abnormally generated heat. FIG. 5 is a schematic plan view of the structure of FIG. 4A when viewed from outside negative-electrode bottom surface 18 along the Z direction.

The second exemplary embodiment and third and fourth exemplary embodiments described later differ from the first exemplary embodiment only in the structure around the negative-electrode lead and are similar to the first exemplary embodiment in the other configuration. In the second to fourth exemplary embodiments, descriptions of effects and modified examples identical to those in the first exemplary embodiment are omitted, and structural elements identical to those in the first exemplary embodiment are assigned with the same reference numerals and redundant descriptions thereof are omitted.

As shown in FIG. 4A, battery module 410 includes cylindrical batteries 11, negative-electrode leads 450, and resin foam components 465. One end 450a of negative-electrode lead 450 extending in a direction is joined to negative-electrode bottom surface 18 of cylindrical battery 11. Negative-electrode lead 450 extends so as to be apart from negative-electrode bottom surface 18 and is connected to negative-electrode plate body 48 (refer to FIG. 1).

Resin foam component 465 is made from a resin foam material that forms and expands when heated. Resin foam component 465 may be, for example, made from a material containing a film forming resin and a thermal expansion capsule and generating gas and expanding when heated or a material containing a urethane resin or a polyethylene resin. Resin foam component 465 may be made from any resin foam material with proviso that the material forms and expands when heated. Resin foam component 465 is fixed to negative-electrode bottom surface 18. As shown in FIG. 5, resin foam component 465 overlaps an entire region of a part of negative-electrode lead 450 (a part indicated with a) extending in a direction. Resin foam component 465 has a rectangular parallelepiped shape. Side edge 488 made up of one side of resin foam component 465 (a side located at the lower left side in the figure) is in contact with an entire region of a widthwise span portion (indicated by arrow A) of negative-electrode lead 450 extending in the direction.

In the configuration described above, if cylindrical battery 11 has abnormally generated heat and cell case 12 (negative-electrode bottom surface 18) of cylindrical battery 11 reaches an abnormally high temperature, resin foam component 465 foams and expands, as shown in FIG. 4B, and increases in height (a measurement in the Z direction). Then, a part of negative-electrode lead 450 near side edge 488 is cut by the side edge and a region around the edge of resin foam component 465 expanding downward in the figure. As a result, negative-electrode bottom surface 18 and negative-electrode plate body 48 are divided from each other and cylindrical battery 11 that has abnormally generated heat is separated from an electric circuit.

Figure 6:
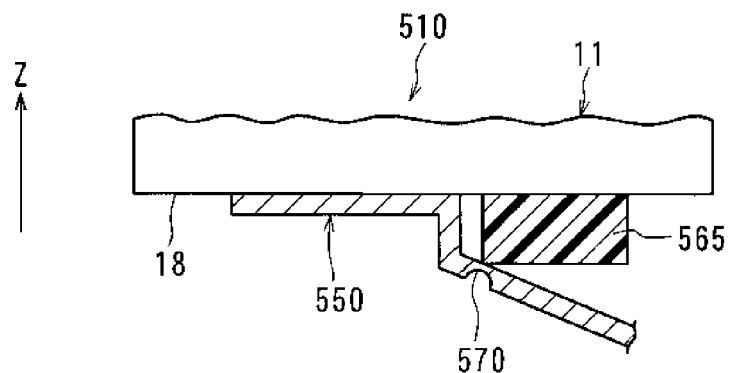
FIG. 6 is a schematic cross-sectional view of a structure corresponding to the structure of FIG. 4A in a battery module according to a modification of the second exemplary embodiment.

The battery module according to the second exemplary embodiment can readily separate cylindrical battery 11 that has abnormally generated heat from the electric circuit only with resin foam component 465 disposed on cell case 12. Preferably, a part of the negative-electrode lead is joined to the resin foam component by laser spot welding or any other technique so that the negative-electrode lead can be more reliably cut off. As shown in FIG. 6, i.e. a schematic cross-sectional view of a structure corresponding to the structure of FIG. 4A in battery module 510 according to a modification of the second exemplary embodiment, a part of negative-electrode lead 550 that is in contact with resin foam component 565 preferably has cutout 570 or a slit so that negative-electrode lead 550 is readily cut off in response to abnormal heat generation in cylindrical battery 11.

Third Exemplary Embodiment

Figure 7A:
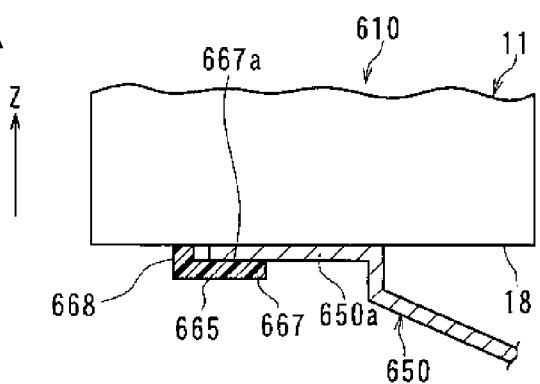
FIG. 7A is a schematic cross-sectional view of a structure corresponding to the structure of FIG. 4A in a battery module according to a third exemplary embodiment.
Figure 7B:
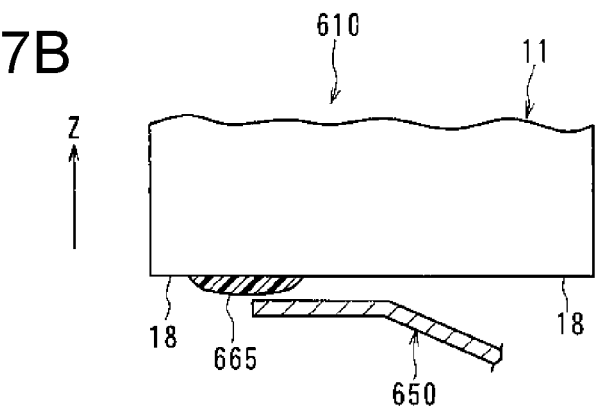
FIG. 7B is a schematic cross-sectional view of a structure corresponding to the structure of FIG. 4B in the battery module according to the third exemplary embodiment.

FIG. 7A is a schematic cross-sectional view of a structure corresponding to the structure of FIG. 4A in battery module 610 according to a third exemplary embodiment, and FIG. 7B is a schematic cross-sectional view of a structure corresponding to the structure of FIG. 4B in battery module 610 according to the third exemplary embodiment.

As shown in FIG. 7A, battery module 610 includes cylindrical batteries 11, negative-electrode leads 650, and thermoplastic resin components 665 that act as an example lead pressing member. Resin component 665 includes negative-electrode lead pressing part 667 and battery connecting part 668. Resin component 665 has a substantially L-shaped cross section. In the cross section shown in FIG. 7A, rectangular negative-electrode lead pressing part 667 and rectangular battery connecting part 668 are orthogonal to each other. Negative-electrode lead pressing part 667 has lead contact plane 667a. An end of negative-electrode lead 650 adjacent to negative-electrode bottom surface 18 has a surface remote from negative-electrode bottom surface 18, and lead contact plane 667a is fastened to the surface or is in contact with the surface without being fastened. Lead contact plane 667a extends in substantially parallel with negative-electrode bottom surface 18. Battery connecting part 668 extends to negative-electrode bottom surface 18 from a part of negative-electrode lead pressing part 667 other than lead contact plane 667a, and a front end of the battery connecting part is joined to negative-electrode bottom surface 18.

Front end 650a of negative-electrode lead 650 adjacent to cylindrical battery 11 is clamped between lead contact plane 667a and negative-electrode bottom surface 18. Front end 650a of negative-electrode lead 650 is pressed by pressure from lead contact plane 667a toward negative-electrode bottom surface 18 and is elastically deformed so as to be put into contact with negative-electrode bottom surface 18 of cylindrical battery 11.

In the configuration described above, if cylindrical battery 11 has abnormally generated heat and cell case 12 (negative-electrode bottom surface 18) of cylindrical battery 11 reaches an abnormally high temperature, resin component 665 melts as shown in FIG. 7B and force for pressing negative-electrode lead 650 toward negative-electrode bottom surface 18 disappears, so that negative-electrode lead 650 can freely move. Then, negative-electrode lead 650 moves toward negative-electrode plate body 48 to correct distortion owing to its internal elasticity, so that the negative-electrode lead is separated from negative-electrode bottom surface 18. This configuration breaks electrical connection between negative-electrode lead 650 and negative-electrode bottom surface 18 and separates cylindrical battery 11 that has abnormally generated heat from an electric circuit.

In the battery module described above, the lead pressing member is resin component 665 that melts when cell case 12 of cylindrical battery 11 reaches an abnormally high temperature. However, the lead pressing member (a component for pressing a negative-electrode lead toward a negative-electrode bottom surface of a cylindrical battery) may be a metallic component (e.g. tin, a tin alloy, or solder) that melts when the cell case of the cylindrical battery reaches an abnormally high temperature.

Fourth Exemplary Embodiment

Figure 8A:
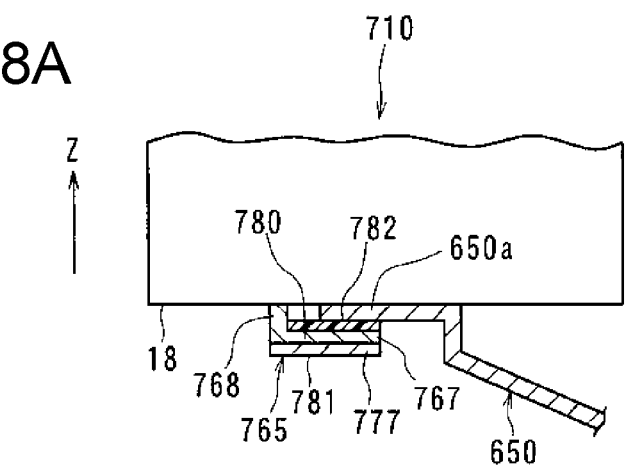
FIG. 8A is a schematic cross-sectional view of a structure corresponding to the structure of FIG. 4A in a battery module according to a fourth exemplary embodiment.
Figure 8B:
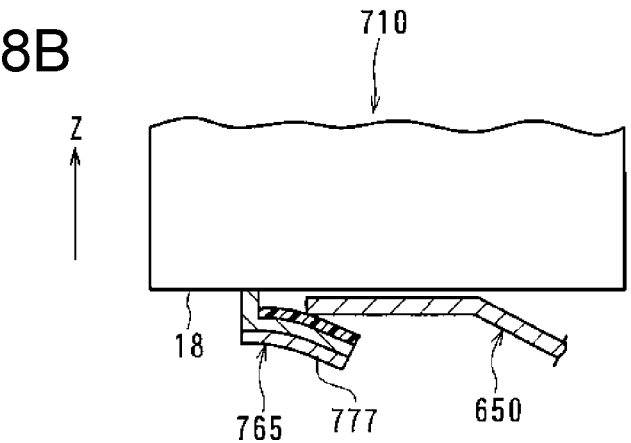
FIG. 8B is a schematic cross-sectional view of a structure corresponding to the structure of FIG. 4B in the battery module according to the fourth exemplary embodiment.

FIG. 8A is a schematic cross-sectional view of a structure corresponding to the structure of FIG. 4A in battery module 710 according to a fourth exemplary embodiment, and FIG. 8B is a schematic cross-sectional view of a structure corresponding to the structure of FIG. 4B in battery module 710 according to the fourth exemplary embodiment.

The fourth exemplary embodiment differs from the third exemplary embodiment in that bimetallic component 765 that contains bimetal 777 is used instead of resin component 665 to act as a lead pressing member (a component for pressing negative-electrode lead 650 toward negative-electrode bottom surface 18 of cylindrical battery 11). In the fourth exemplary embodiment, structural elements identical to those in the third exemplary embodiment are assigned with the same reference numerals and redundant descriptions thereof are omitted.

As shown in FIG. 8A, bimetallic component 765 includes negative-electrode lead pressing part 767 and battery connecting part 768. Bimetallic component 765 has a substantially L-shaped cross section. In the cross section shown in FIG. 8A, rectangular negative-electrode lead pressing part 767 and rectangular battery connecting part 768 are orthogonal to each other. Bimetallic component 765 includes first metal part 780 having a substantially L-shaped cross section, second metal part 781, and insulating film 782 made from an insulating material such as a resin. Second metal part 781 is bonded to an outside surface of first metal part 780 remote from cylindrical battery 11 by cold rolling. Second metal part 781 differs from first metal part 780 in thermal expansion coefficient. Second metal part 781 and a part of first metal part 780 to which second metal part 781 is bonded constitute a bimetal plate. First and second metal parts 780, 781 are each made from an alloy of iron and nickel doped with a substance such as manganese, chromium, or copper, for example. Insulating film 782 is fastened to an inside surface of first metal part 780 facing negative-electrode bottom surface 18 through a gap in the Z direction. A surface of insulating film 782 adjacent to negative-electrode bottom surface 18 extends in substantially parallel with negative-electrode bottom surface 18.

Front end 650*a* of negative-electrode lead 650 adjacent to cylindrical battery 11 is clamped between insulating film 782 and negative-electrode bottom surface 18. Front end 650*a* of negative-electrode lead 650 is pressed by pressure from insulating film 782 toward negative-electrode bottom surface 18 and is elastically deformed so as to be put into contact with negative-electrode bottom surface 18 of cylindrical battery 11.

In the configuration described above, if cylindrical battery 11 has abnormally generated heat and cell case 12 (negative-electrode bottom surface 18) of cylindrical battery 11 reaches an abnormally high temperature, the bimetal plate curves so as to be apart from negative-electrode bottom surface 18 as shown in FIG. 8B and in response to the curvature, negative-electrode lead 650 moves away from negative-electrode bottom surface 18 toward negative-electrode plate body 48 to correct distortion owing to its internal elasticity. This configuration electrically breaks negative-electrode lead 650 off negative-electrode bottom surface 18 and separates cylindrical battery 11 that has abnormally generated heat from an electric circuit.

In the third exemplary embodiment described above, bimetallic component 765 is used to press negative-electrode lead 650 toward negative-electrode bottom surface 18. However, the bimetallic component may be replaced by an elastic member or a spring that inherently shrinks in response to a rise in temperature to act as a lead pressing member. The elastic member or the spring may be designed to press negative-electrode lead 650 toward negative-electrode bottom surface 18 while cylindrical battery 11 is normal, and shrink and thereby lose pressing force when cylindrical battery 11 has abnormally generated heat. As described at the beginning of the exemplary embodiments, a new exemplary embodiment may be made by combining two or more structural elements out of structural elements described in the first to third exemplary embodiments and all the modifications. For example, a heat shutoff mechanism may include two or more components out of the melting member of the first exemplary embodiment, the resin foam component of the second exemplary embodiment, and the lead pressing members of the third and fourth exemplary embodiments.

The invention claimed is:

1. A battery module having a plurality of battery cells each including a cell case and a battery element contained in the cell case, the battery module comprising:
    a lead to electrically connect a terminal of each of the battery cells to a current collector; and
    a heat shutoff mechanism to break electrical connection between the terminal and the current collector by heat from the cell case when the cell case reaches a predetermined temperature or higher,
    wherein the heat shutoff mechanism includes a melting member configured to melt, and the melting member includes a metal having a melting point which is lower than a melting point of at least one of the leads.

2. The battery module according to claim 1, wherein the melting member constitutes at least a part of the lead extending in a direction.

3. The battery module according to claim 1, wherein the heat shutoff mechanism includes a resin foam component attached to the cell case, and wherein the lead is configured to be cut by force from the resin foam component foaming and expanding with the heat.

4. The battery module according to claim 1, wherein the heat shutoff mechanism includes a lead pressing member to press the lead toward the cell case so that the lead is put into contact with the cell case, and wherein the lead is configured to be separated from the cell case when pressing force from the lead pressing member disappears because of the heat.

5. The battery module according to claim 4, wherein the lead pressing member is any one of a resin component configured to melt with the heat and a bimetallic component that contains a bimetal configured to be deformed by the heat.

6. A battery module having a plurality of battery cells each including a cell case and a battery element contained in the cell case, the battery module comprising:
    a lead to electrically connect a terminal of each of the battery cells to a current collector; and
    a heat shutoff mechanism to break electrical connection between the terminal and the current collector by heat from the cell case when the cell case reaches a predetermined temperature or higher,
    wherein the heat shutoff mechanism includes a resin foam component attached to the cell case, and
    wherein the lead is configured to be cut by force from the resin foam component foaming and expanding with the heat.

7. A battery module having a plurality of battery cells each including a cell case and a battery element contained in the cell case, the battery module comprising:
    a lead to electrically connect a terminal of each of the battery cells to a current collector; and
    a heat shutoff mechanism to break electrical connection between the terminal and the current collector by heat from the cell case when the cell case reaches a predetermined temperature or higher,
    wherein the heat shutoff mechanism includes a lead pressing member to press the lead toward the cell case so that the lead is put into contact with the cell case, and
    wherein the lead is configured to be separated from the cell case when pressing force from the lead pressing member disappears because of the heat.

8. The battery module according to claim 7, wherein the lead pressing member is any one of a resin component configured to melt with the heat and a bimetallic component that contains a bimetal configured to be deformed by the heat.

* * * * *